United States Patent
Patil et al.

(10) Patent No.: US 12,524,868 B2
(45) Date of Patent: Jan. 13, 2026

(54) RETAIL SHELF IMAGE PROCESSING AND INVENTORY TRACKING SYSTEM

(71) Applicant: Target Brands, Inc., Minneapolis, MN (US)

(72) Inventors: Arun Patil, Bengaluru (IN); Prakash Mall, Bengaluru (IN); Snigdha Samal, Bengaluru (IN); Soma Halder, Kolkata (IN); Mohit Sethi, Bengaluru (IN); Swaroop Shivaram, Bengaluru (IN)

(73) Assignee: Target Brands, Inc., Minneapolis, MN (US)

( * ) Notice: Subject to any disclaimer, the term of this patent is extended or adjusted under 35 U.S.C. 154(b) by 709 days.

(21) Appl. No.: 17/681,507

(22) Filed: Feb. 25, 2022

(65) Prior Publication Data

US 2023/0274410 A1    Aug. 31, 2023

(51) Int. Cl.
| | | |
|---|---|---|
| G06T 7/00 | (2017.01) | |
| G06Q 10/087 | (2023.01) | |
| G06T 3/4038 | (2024.01) | |
| G06T 3/608 | (2024.01) | |
| G06T 7/70 | (2017.01) | |
| G06V 10/82 | (2022.01) | |

(Continued)

(52) U.S. Cl.
CPC ........... *G06T 7/001* (2013.01); *G06Q 10/087* (2013.01); *G06T 3/4038* (2013.01); *G06T 3/608* (2013.01); *G06T 7/0008* (2013.01); *G06T 7/70* (2017.01); *G06V 10/82* (2022.01); *G06V 20/52* (2022.01); *G06V 20/64* (2022.01); *G06T 2207/20084* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 10,607,182 B2 * | 3/2020 | Shah | G05D 1/246 |
| 12,062,013 B1 * | 8/2024 | Zhu | G06F 16/23 |
| 2018/0322448 A1 | 11/2018 | Nemati et al. | |

(Continued)

OTHER PUBLICATIONS

Singh, Ankit "The Best Way to Address On-Shelf Availability Issue in Retail", https://blog.paralleldots.com/featured/how-to-address-on-shelf-availability-issue-in-retail/, ParralellDots, Dec. 2, 2019, 8pgs.

Singh, Ankit "Image Recognition for Retail Shelf Monitoring", https://blog.paralleldots.com/featured/image-recognition-for-retail-shelf-monitoring/, ParallelDots, Jun. 19, 2020, 7 pgs.

(Continued)

*Primary Examiner* — Helen Zong
(74) *Attorney, Agent, or Firm* — Merchant & Gould P.C.

(57) ABSTRACT

The disclosed system and method relate to automatically detecting empty spaces on retail store shelves, identifying the missing product(s) and causing the space to be replenished or restocked. For example, stores may use shelf-mounted imaging devices to capture images of shelves across the aisle from the imaging devices. The images captured by the imaging devices may be pre-processed to de-warp, de-skew images and stitch together multiple images in order to retrieve an image that captures a full width of a shelf. The pre-processed images can then be used to detect products on the shelf, identify the detected products. An iterative projection algorithm or product fingerprint matching algorithm can be used to identify the products. When an incorrect product listing or an empty shelf space is encountered, a message may be sent to the store employee to remedy the issue.

19 Claims, 9 Drawing Sheets

(51) Int. Cl.
 *G06V 20/52* (2022.01)
 *G06V 20/64* (2022.01)

(56) References Cited

U.S. PATENT DOCUMENTS

2019/0180150 A1   6/2019  Taylor et al.
2020/0215698 A1*  7/2020  Bogolea ................ B25J 11/008
2022/0230216 A1*  7/2022  Buibas ................. G06V 10/454
2023/0401531 A1* 12/2023  Cortese ................ G06V 20/44
2023/0421705 A1* 12/2023  Bogolea ................ H04N 23/60

OTHER PUBLICATIONS

Paralelle Dots, Inc. "Win Shoppers in the Store through Perfect Retail Execution", https://www.karna.ai/retail-shelf-monitoring, 2019, 14pgs.

* cited by examiner

RETAIL SHELF IMAGE PROCESSING AND INVENTORY TRACKING SYSTEM

BACKGROUND

In general, stores display retail products and grocery items on store shelves for customer selection. According to a nationwide survey commissioned by a leading provider of retail and category optimization solutions, nearly 70% of U.S. adults would avoid shopping at a store if they encountered empty shelves. Retailers expend significant resources to ensure that store shelves are well-stocked. For example, retailers may periodically require employees to visually inspect shelves throughout the day and ensure that missing are replenished, or misplaced items are returned. Visual inspections can be labor-intensive, time-consuming and inconsistent.

SUMMARY

Embodiments of the disclosure are directed to monitoring inventory positioned on store shelves, and in some instances, identifying missing and misplaced products within store shelves to enable the efficient restocking of the products.

In a first aspect, a method for identifying one or more products from an image is disclosed. The method comprises: receiving the image from an imaging device; detecting one or more products within the image; generating a fingerprint for a product, wherein the product is one of the one or more products; comparing the generated fingerprint with a plurality of reference fingerprints; determining one or more matches between the fingerprint and the plurality of reference fingerprints; using additional parameters associated with the image and the product, refining the one or more matches to a final match between the fingerprint and a final reference fingerprint; identifying a final reference product associated with the final reference fingerprint; and identifying the product as being the final reference product.

In a second aspect, a system for identifying one or more products from an image is disclosed. The system comprises: an imaging device; a computing system comprising: a processor; a memory communicatively connected to the processor which stores program instructions executable by the processor, wherein, when executed the program instructions cause the system to: receive the image from the imaging device; detect one or more products within the image; generate a fingerprint for a product, wherein the product is one of the one or more products; compare the generated fingerprint with a plurality of reference fingerprints; determine one or more matches between the fingerprint and the plurality of reference fingerprints; using additional parameters associated with the image and the product, refine the one or more matches to a final match between the fingerprint and a final reference fingerprint; identify a final reference product associated with the final reference fingerprint; and identify the product as being the final reference product.

In a third aspect, a method for identifying one or more missing products from a shelf image is disclosed. The method comprises: receiving the shelf image from an imaging device, wherein the shelf image is an image of shelf within a retail store; detecting a position in the shelf image that is missing a missing product; analyzing one or more prior shelf images, wherein the one or more prior shelf images are images of the shelf acquired earlier in time; generating a product fingerprint of a shelf product occupying the position in the one or more prior shelf images; comparing the product fingerprint with a plurality of reference fingerprints; determining one or more product matches between the product fingerprint and the plurality of reference fingerprints; using additional parameters associated with the image and the missing product, refining the one or more product matches to a final product match between the product fingerprint and a final reference product fingerprint; identifying a final reference product associated with the final reference product fingerprint; and identifying the missing product as being the final reference product; and sending a message to one or more user computing devices that the shelf is missing the missing product.

BRIEF DESCRIPTION OF DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
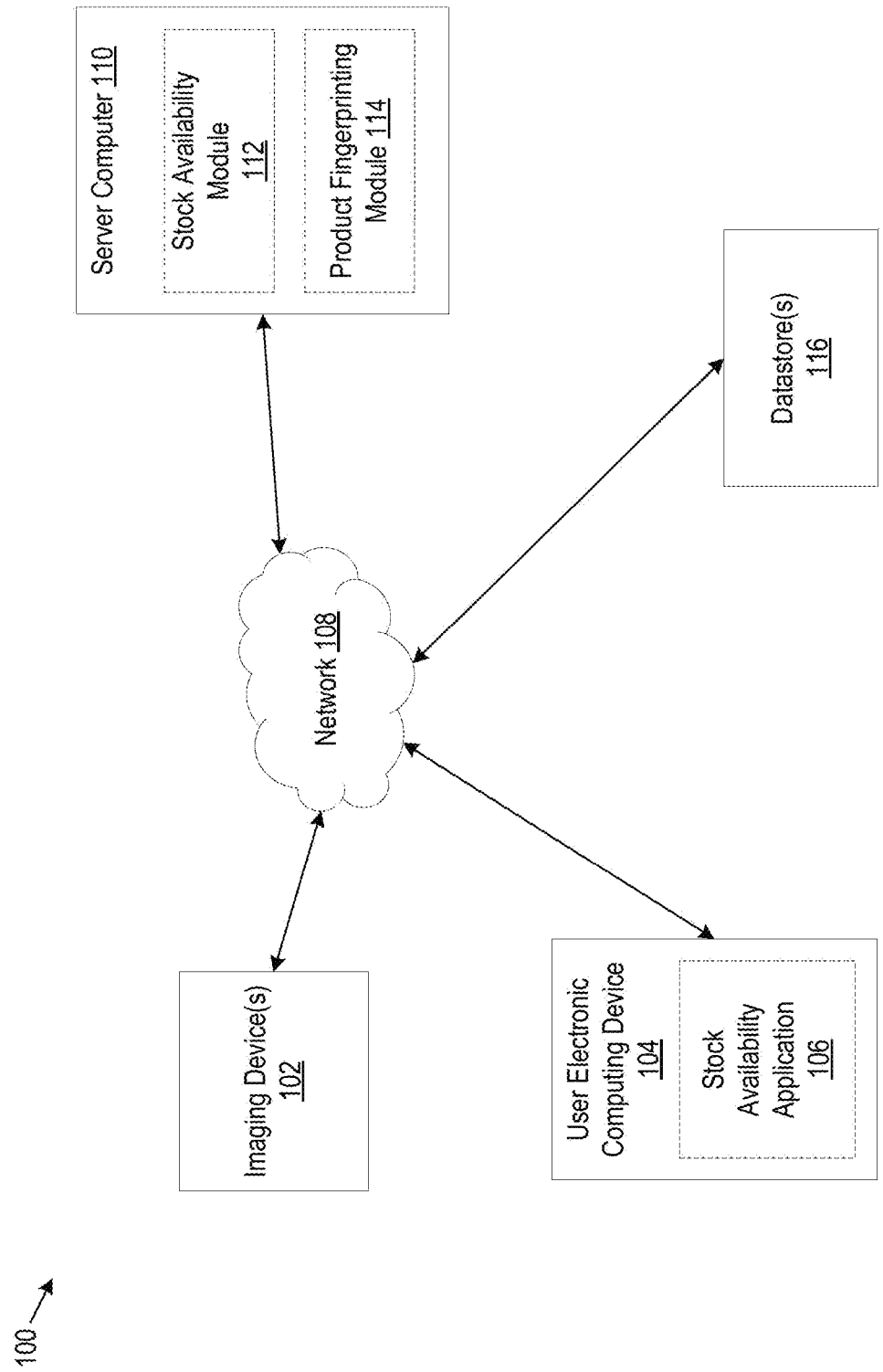
FIG. 1 illustrates an example stock availability system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The current process of replenishing empty shelves in stores includes store employees periodically walking through the aisles of the store to identify empty shelf space, identifying the missing products, identifying misplaced items, restocking the missing products and returning the misplaced items to its location. The process may be labor-intensive, inconsistent and time-consuming.

In general, the subject matter of the present disclosure relates to automatically detecting empty spaces on retail store shelves, and identifying the missing product(s), thereby allowing the shelf space to be reorganized, replenished, and/or restocked as necessary. For example, stores may use shelf-mounted imaging devices to capture images of shelves across the aisle from the imaging devices. The images captured by the imaging devices may be pre-processed to de-warp images and stitch together multiple images in order to retrieve an image that captures a full width of a shelf. The pre-processed images can then be used to detect products on the shelf, identify the detected products and when an incorrect product listing or an empty shelf space is encountered, a message may be sent to the store employee to remedy the issue.

In some examples, identifying the detected products includes identifying specific items within images of the shelves. Specifically, object detection algorithms may be used to detect and place bounding boxes around individual products on the shelf image. Pre-existing planogram data and visual features of the detected product image may be used to identify the product detected by the object detection algorithms, for example based on a proximity or location comparison between the location of the object and the expected location of the object in a store planogram.

In some examples, to address the potential challenges inherent in automatically recognizing which facings are missing or output of place from an image of the shelf, a matching process may be employed to match detected products to planogram entries via an iterative projection algorithm.

In some examples, automatically learning a mapping between planogram space and the image space is difficult. An initial mapping between the planogram space and the image space may be inferred and the mapping may be continually refined during an iterative process that is repeated until the mapping between the planogram space and the image space converges. For example, the iterative process may include transforming the planogram facing positions into image spaces, matching the planogram facings to detected items using visual and spatial similarity, and re-computing the transformation map when there is a match between the planogram space and the image space.

FIG. 1 illustrates an example stock availability system 100. In some examples, the stock availability system ensures that store shelves are adequately stocked with products at the correct positions. The stock availability system 100 includes one or more imaging devices 102, a user electronic computing device 104, a network 108, a server computer 110 and one or more datastores 116. In some examples, the server computer 110 may include a stock availability module 112 and a product fingerprinting module 114. More, fewer or different modules can be used.

In some examples, the one or more imaging devices 102 may include one or more imaging devices that may be shelf-mountable and can be used to capture images of the opposite-facing shelf. The one or more imaging devices may be configured to capture high-definition images so that size, color, and textual details associated with the products on the opposite-facing shelf are distinguishable. The one or more imaging devices 102 may include fish-eye lenses in order to capture wide shelf areas. The one or more imaging devices 102 may be battery-powered in order to make installation of the one or more imaging devices 102 on store shelves easier.

The one or more imaging devices 102 may be configured to capture images periodically during the day. For example, the one or more imaging devices 102 may be configured to capture 4-10 images per day in order to preserve battery and extend battery life to 1-2 years. The number of images captured per day and the battery life may be variable. The one or more imaging devices 102 may support network connectivity, whereby the imaging device 102 may connect to the server computer 110 through a wireless network, such as network 108 and transmit the captured images or receive instructions regarding the capture of images or image device settings. Other types of connectivity to the server computer 110 are also possible.

In other examples, the one or more imaging devices 102 may also include high-resolution camera that are used in a studio setting to capture reference images of each or a subset of product that is stocked in the store. The one or more imaging devices 102 may further include one or more vision sensors that are configured within point-of-sale cameras, store employees' handheld devices or other cameras within the store.

In some examples, user electronic computing device 104 is an electronic computing device of the user. For example, the user electronic computing device 104 may receive a voice of text messages from the stock availability module 112 regarding updates on status of stock on store shelf. In other examples, the user electronic computing device 104 may include a stock availability application 106 that receives a notification associated regarding the status of stock on store shelf.

In some examples, the electronic computing device 104 can be a desktop computer, a laptop computer, a mobile electronic computing device such as a smartphone or a tablet computer. The electronic computing device permits the user to access the server computer 110 over a network 108. In some examples, the users of the electronic computing device may include employees of the store that is monitoring the shelves for missing and misplaced products.

Although a single user electronic computing device 104 is shown, the example stock availability system 100 may allow hundreds, or more computing devices to connect to the server computer 110.

In some examples, the stock availability application 106 may be a web application or mobile application that can display an updated status of the stock on the store shelf. For example, the stock availability application 106 may include the latest, as well as a historical list of images captured by the imaging device 102 and sent to the stock availability module 112. The stock availability application 106 may also include one or more selections that allow users to make adjustments to the product detection and identification operations performed by the stock availability module 112.

In some examples, the network 108 is a computer network, such as the Internet. The user on user electronic computing device 104 and the imaging device 102 can access the server computer 110 via the network 108.

In an example, the server computer 110 may be a server computer of an enterprise or organization that is a retailer of goods. However, the server computer 110 may include server computers of other types of enterprises as well. Although a single server is shown, in reality, the server computer 110 can be implemented with multiple computing devices, such as a server farm or through cloud computing. Many other configurations are possible. In some examples, the server computer 110 may be located at a central server that is located away from the retailer location. In other examples, the server computer 110 may be located at the retailer location itself.

In one example, the stock availability module 112 receives and processes images of the store shelves and detects and identifies any missing or misplaced items. As discussed in more detail later herein, the stock availability module 112 may analyze the images received from the imaging device 102 to detect the placement of products within the shelf and identify the detected products. Once the products are recognized, the stock availability module 112 identifies and missing or misplaced products within the shelf and determines which product is missing or misplaced. The stock availability module may then send the status of the stock on store shelf to the user electronic computing device 104 in a message or notification that is sent to the stock availability application 106. The stock availability module 112 is described in further detail in relation to FIGS. 2-6.

In some examples, the product fingerprinting module 114 may be used to create a fingerprint for each product that is stocked by the store. For example, as described in relation to FIG. 2 one of the methods by which the stock availability module 112 may identify a missing or misplaced item on the shelf includes using a product fingerprint matching method. The product fingerprinting module 114 may be used to create and store fingerprints for each product carried by the store as a reference. The product fingerprinting module 114 may only be used in creating the reference product fingerprints when the product fingerprint matching method is implemented for the product recognition and identification. The configuration of the product fingerprinting module 114 is described in greater detail in relation to FIGS. 7-8.

The example datastore(s) 116 may include one or more electronic databases that can store one or more data tables that includes data associated with the enterprise. The stock availability module 112 and the product fingerprinting module 114 may store and retrieve data in the datastore(s) 116 via the network 108. The datastore 116 may be maintained by the enterprise or organization itself or be maintained by one or more external, third-parties associated with the enterprise. The datastore 116 can be accessed by the server computer 110 to retrieve relevant data.

Figure 2:
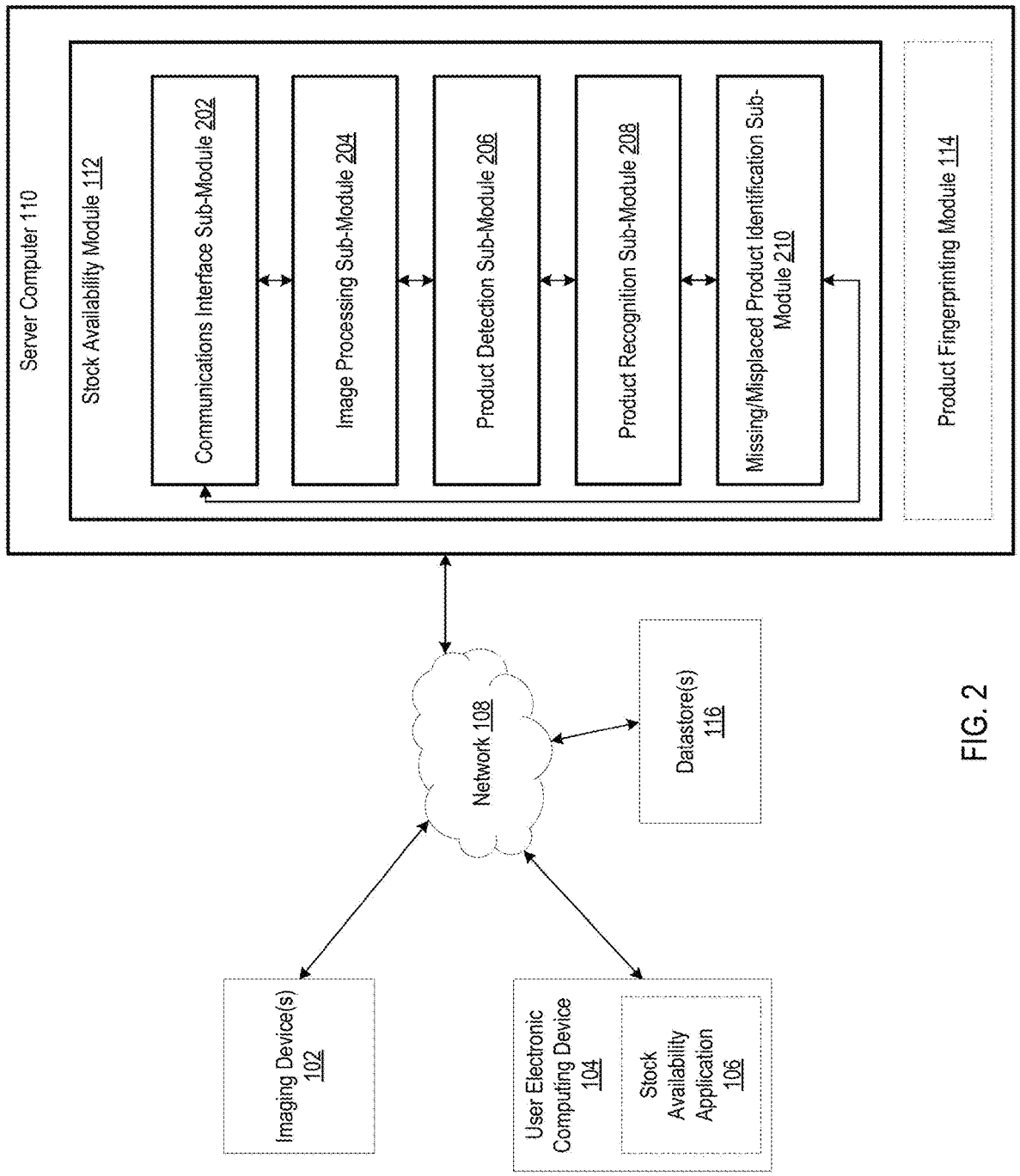
FIG. 2 illustrates an example configuration of the stock availability module.

FIG. 2 illustrates an example configuration of the stock availability module 112. As detailed in relation to FIG. 1, the server computer 110 includes the stock availability module 112, which in turn may be implemented using one or more sub-modules. The one or more sub-modules of the stock availability module 112 may communicate with the datastore 116 through the network 108. For example, the sub-modules of the stock-availability module 112 may transmit data to be stored in the data store 116 and receive data stored in the datastore 116.

In some examples, the disclosed stock availability module 112 may include a communications interface sub-module 202, an image processing sub-module 204, a product detection sub-module 206, a product recognition sub-module and a missing/misplaced product identification sub-module 210. More or fewer sub-modules may be used to implement the stock availability module 112.

In some examples, the communications interface sub-module 202 is configured to receive input data and send output data. In some examples, the communications interface sub-module 202 is configured to receive and send data to the datastore 116 through the network 108. For example, the communications interface sub-module 202 may receive images from the imaging device 102 periodically, at scheduled time intervals throughout the day, via wireless communication between the imaging device 102 and the server computing device 110. Upon receiving the one or more images from the imaging device, the server computer 110 may store the images in the datastore 116.

In some examples, where the server computer 110 is a central server computer that is located away from the retailer location where the imaging devices 102 are located, the received images may be saved in the server computer 110 or the datastore 116 with tags to identify the retailer location, the aisle number, the shelf number, the camera number, date and time associated with the image. The communications interface sub-module 202 of the stock availability module 112 may periodically, at the scheduled time intervals, access the stored images in the server computer 110 or the datastore 116 via communications through the network 108, to retrieve images for further processing of the images using one or more of the other sub-modules of the stock availability module 112.

In other examples, where the server computer 110 is a local server computer that is located at the same retailer location as the location of the imaging devices 102, the received images may be saved in the server computer 110 with tags to identify the aisle number, the shelf number, the camera number, date and time associated with the image. The stored images may be used by other sub-modules of the stock availability module 112 to access the images for further processing The communications interface sub-module 202 may also send out messages, notifications or other types of communication to the user electronic computing device 104. For example, after detecting and identifying missing/misplaced products, as further described in relation to the missing/misplaced product identification sub-module 210, the communications interface sub-module 202 may send one or more text messages, push notifications or other types of communications to the user electronic computing device 104 directly or to the stock availability application 106. The text messages, notifications or other types of communications may include identifying information associated with one or more of: the imaging device, store, aisle, shelf, missing or misplaced product. Other types of information may also be part of the communication from the communications interface sub-module 202.

In some examples, the image processing sub-module 204 is configured to perform image processing on the images received by the communications interface sub-module 202. For example, the images captured by the imaging devices 102 may be warped due to the angle and type of imaging device lens. In addition, due to the length of the shelf, a single image from a single imaging device may not be enough to capture the image of the entire shelf.

Prior to detecting products within the image, or identifying a detected product or empty product space, the images received by the communications interface sub-module from the imaging device 102 is processed to de-warp and stitch together images in order to arrive at a single de-warped image of the full shelf. The processed image may be stored in the server computer 110 or the datastore 116 depending on whether the server computer 110 is local to the retail location or a central server computer. An example of the pre-processed images and the post-processed image produced by the image processing sub-module 204 is described in further detail in relation to FIG. 3.

In some examples, the product detection sub-module 206 is configured to analyze the processed image produced by the image processing sub-module 204 and detect the presence of individual objects within the processed image by identifying the boundaries of the objects. For example, the processed image may be retrieved from the server 110 or datastore 116 and analyzed to detect the presence of individual objects within the processed image. Objects within an image may be detected using an image detection architecture. For example, the Cascade R-CNN is an object detection architecture that works well in recognizing individual products within images of store shelves filled with products. Other types of object detection architectures can also be used in detecting products within the processed images from the image processing sub-module 204. The method of detecting products within a store shelf is described in Rong et al., "A Solution to Product detection in Densely Packed Scenes", 2020.

For example, once the image is analyzed and individual products within the images are detected, the product detection sub-module 206 may draw a bounding box around the boundaries of the product. The bounding boxes may help the stock availability module 112 to recognize a group of pixels within the image as belonging to a single product. In other examples, bounding boxes may also be drawn around empty shelf spaces that is meant to be occupied by an object, but does not include any objects. Other ways of identifying individual products within the processed image and empty spaces within the shelf image are also possible.

In some examples, the product recognition sub-module 208 is configured to recognize products within the analyzed image from the product detection sub-module 206. For example, a retail store may include products of varying sizes and shapes. For example, a product in the shelf image can vary from a sizeable object such as a box of diapers to a tiny beauty product like eye lashes. The product recognition sub-module 208 is configured to automatically and accurately predict a product in a given image while accommodating new products over time.

Although the present disclosure focuses on product recognition within a controlled environment, such as store shelf, and is used for monitoring the shelves for out of stock detection the product recognition sub-module 208 may be used for other purposes such as monitoring planogram compliance, detecting theft at point of sale or checkout, improving visual search in a digital space, and frictionless checkout among other uses.

In some examples, the analyzed image from the product detection sub-module 206 includes bounding boxes around each individual object that has been detected within the image. The product recognition sub-module 208 analyzes the image to identify the product that is associated with each of the bounding boxes.

For example, identifying an object can include recognizing the object as being associated with a particular product within the inventory of products carried by the store. There may be a plurality of methods for identifying an object. For example, the present disclosure describes at least two different solutions of identifying products from the shelf image. A first solution includes using an iterative projections algorithm to simultaneously map planogram data to the shelf image and to detect and identify individual products within the image. The iterative solutions algorithm method is described in greater detail in relation to FIG. 5.

An alternate solution includes using a product fingerprint matching method to detect a product within the image. The product fingerprint matching method can detect products without the need to map the product to a planogram. The product fingerprint matching method operates independently of the planogram. Thus, the product fingerprint matching solution scalable and is not dependent on a planogram, which can be stale or not up to date. The product fingerprinting matching method is described in greater detail in relation to FIGS. 7 and 8.

In an example, the missing/misplaced product identification sub-module 210 is configured to detect empty shelf space that is missing a product or shelf space that includes a product in a spot other than where the product is supposed to be stocked. In other words, the missing/misplaced product identification sub-module 210 identifies empty facings and misplaced products within the shelf image. For example, the missing/misplaced product identification sub-module 210 may receive the processed image from the product-recognition sub-module and identify whether a bounding box within the image is empty or contains an object that does not correlate to the planogram. As a result, the missing/misplaced product identification sub-module 210 may tag the bounding boxes or positions within the image that requires further action.

For example, one method by which the missing/misplaced product identification sub-module 210 identifies an empty space is by identifying that the iterative projection algorithm or the product fingerprint matching method, whichever technique is used for the product recognition, did not yield a match. In such cases, the missing/misplaced product identification sub-module 210 may verify that the space is indeed empty by comparing the current image with historical images of the shelf over time. Machine learning algorithms may also be trained to recognize empty shelf space over time.

In some examples, where the iterative projection algorithm is used in recognizing products, once a shelf space is determined to be empty, the product that is supposed to occupy the space is identified using a planogram image. For example, the planogram image may be a visual representation of a retailer's products on display, including a mapping of products stocked by the store to specific positions within the retailer store, including the specific aisle, shelf and position within that shelf where the product may be displayed. The planogram associated with a particular retail location may be determined by the retailer in advance. The planogram image may be created and stored in the datastore 116 or the server computer 110. The missing/misplaced product identification sub-module 210 may retrieve the planogram image from the datastore 116 or the server computer 110 to determine which product corresponds to the empty shelf space identified by the missing/misplaced product identification sub-module 210. For example, the product on the planogram image that is associated with the space corresponding to the empty space on the shelf image is identified to be the product that is out of stock on the shelf.

In other examples, where the product fingerprint matching method is used in recognizing products, once a shelf space is determined to be empty, historical images of the shelf is analyzed to determine the product that is supposed to occupy the space. For example, the missing/misplaced product identification sub-module 210 may retrieve historical images associated with the shelf and acquired within a specific time interval, such as within the last day or last three days or last week, from the datastore 116 or server computer 110 to analyze the previous images, and determine the fingerprint of the product occupying the space that is currently empty. After acquiring a fingerprint of the product, product recognition techniques using the product fingerprint matching method, as described further in relation to FIGS. 7 and 8 may be used to determine the identity of the missing product. The missing/misplaced product identification sub-module 210 may use other techniques to identify missing products as well.

In addition to determining missing products, the missing/misplaced product identification sub-module 210 may also analyzes each of the products recognized by the product recognition sub-module 208 in order to determine whether each of the products within the shelf image are in fact positioned correctly or whether the product is misplaced. For example, the missing/misplaced product identification sub-module 210 may verify that each of the recognize products are occupying the correct shelf space by comparing the recognized products with a reference listing of products on the planogram image.

When the missing/misplaced product identification sub-module 210 identifies a missing or misplaced product, the missing/misplaced product identification sub-module sends a notification to the communications interface sub-module 202 to alert the user electronic computing device 104 that an empty space has been detected. In some examples, the missing/misplaced product identification sub-module 210 may interface with the product recognition sub-module 208 to retrieve and send the communication interface sub-module 202 identifying information associated with one or more of: the imaging device, store, aisle, shelf, missing product.

Similarly, when the missing/misplaced product identification sub-module 210 identifies a product in a particular position within the image that does not match the product that is associated with the position on the planogram, the missing/misplaced product identification sub-module 210 may interface with the product recognition sub-module 208 to retrieve and send the communication interface sub-module 202 identifying information associated with one or more of: the imaging device, store, aisle, shelf, misplaced product and the correct product.

In some examples, as described above, the stock availability module 112 may store data associated with the stock availability module in one or more datastore, including the datastore 115. For example, the data from the stock availability module 112 may be stored in a database format.

In some examples, the data that is stored in the datastore 116 may include: a store identifier that identifies the store, a camera identifier that identifies the camera, date and time when an image is captured, a planogram identifier associated with the shelf on which the camera is focused on, the department identifier identifying the department associated with the store shelf, such as the toy department or shoe department, a status based on an analysis of the shelf image, an images from a left imaging device that captures the left portion of a shelf and an image from a right imaging device that captures the right portion of the shelf.

For example, an example configuration of a database storing data related to the store shelf is illustrated below in Table 1. In other examples, more or fewer data associated with the store shelf may be stored in datastore 116. In other examples, the data may be split between multiple datastores that are connected via a network.

TABLE 1

Example Shelf Data

| Store ID | Camera ID | Event Date/Time | Planogram ID | Department | Status | Left Image | Right Image |
|---|---|---|---|---|---|---|---|
| T0206 | 125139 | Dec. 14, 2021 16:45 | A2048PE | Diapers | Processed | Left1_image.jpeg | Right1_image.jpeg |
| T0693 | 125172 | Dec. 14, 2021 16:44 | F212QJJ | Cookie | Anomaly_Detected | Left2_image.jpeg | Right2_image.jpeg |
| T1244 | 124106 | Dec. 14, 2021 16:35 | E003X4L | Cereal | Camera Disabled | Left3_image.jpeg | Right3_image.jpeg |

In some examples, the data that is stored in the datastore 116 may also include: a stitched image that includes a single image that is generated by stitching together the images from the left imaging device and the right imaging device, a detection image that highlights any detected anomalies within the shelf image, list of products detected within the shelf image, list of products that are identified as missing within the shelf image and list of products that are identified as including a misplaced or mis-shelved item within the shelf image.

For example, an example configuration of a database storing additional data related to the store shelf is illustrated below in Table 2. In some examples, more or fewer data associated with the store shelf may be stored in datastore 116. In other examples, the data may be split between multiple datastores that are connected via a network.

TABLE 2

Example of Additional Shelf Data

| Stitched Image | Detection Image | List of Top Products | List of Empty Products | List of misplaced or mis-shelved items | Number of anomalies |
|---|---|---|---|---|---|
| Stitched_image1.jpeg | Detection_Image1.jpeg | Diapers Giant Pack Size 4 - 148 ct - up & up; Diapers Giant Pack - Size 5 - 128 ct- up & up | Luvs Pro Level Leak Protection Diapers Giant Pack | null | 1 |

TABLE 2-continued

Example of Additional Shelf Data

| Stitched Image | Detection Image | List of Top Products | List of Empty Products | List of misplaced or mis-shelved items | Number of anomalies |
| --- | --- | --- | --- | --- | --- |
| Stitched_image2.jpeg | Detection_Image2.jpeg | Tate's Bake Shop Chocolate Chip Cookies - 7 oz | null | null | 0 |
| Stitched_image3.jpeg | Detection_Image3.jpeg | Frosted Flakes Breakfast Cereal - 24 oz - Kellogg's; | General Mills Family Size Golden Grahams Cereal - 18.9 oz General Mills Family Size Reeses Puffs Cereal - 19.7 oz | null | 1 |

Figure 3:
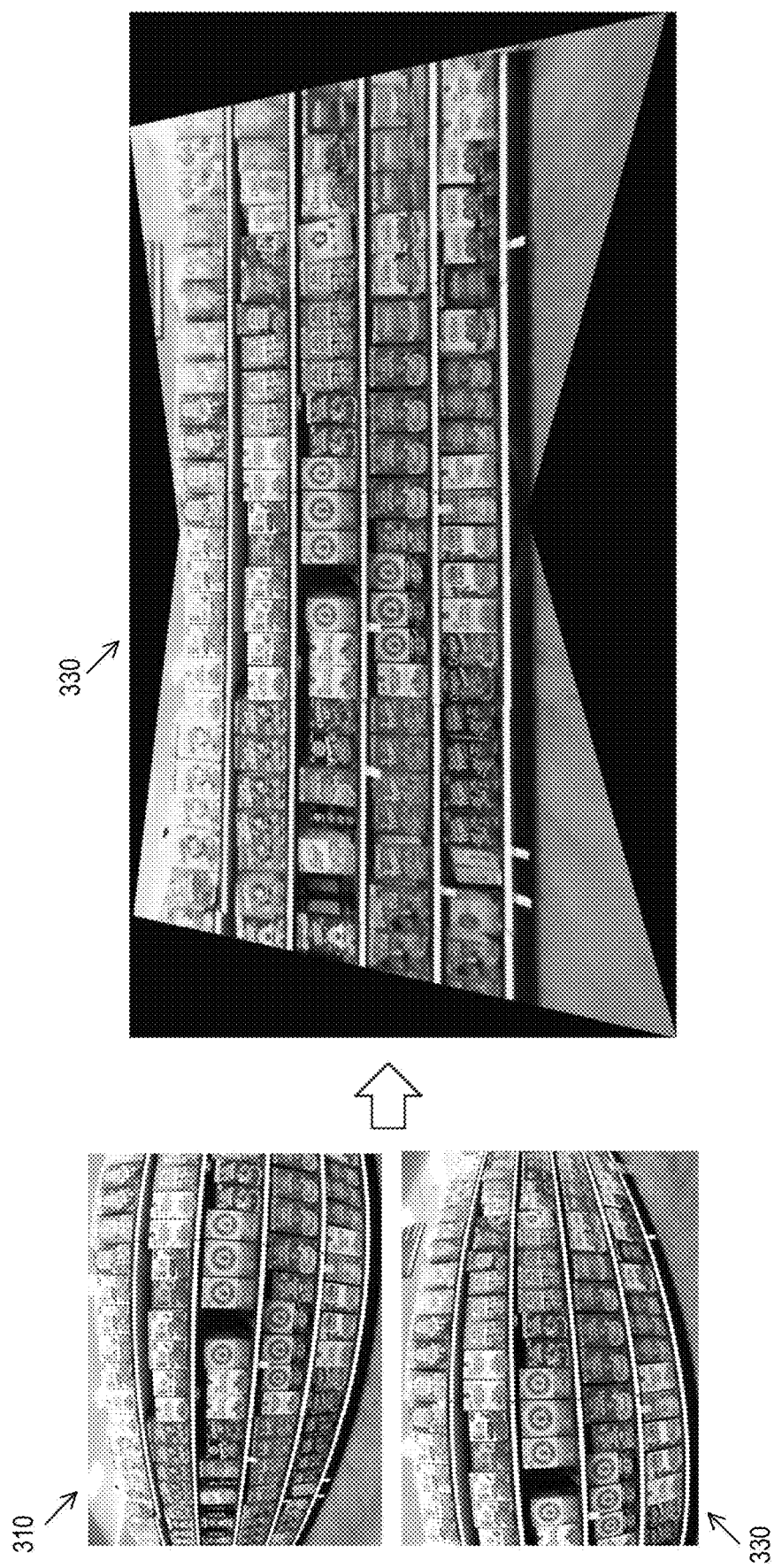
FIG. 3 illustrates an example visual representation of the transformation of a plurality of raw images to a processed image.

FIG. 3 illustrates an example visual representation of the transformation of a plurality of raw images to a processed image.

In some examples, the stock availability system 100 may include a plurality of imaging devices 102. For example, a shelf in a store may include multiple imaging devices to acquire images of different portions of the shelf opposite to the position where the imaging devices are mounted. For example, a first image 310 and a second image 320 may be acquired by a first imaging device and a second imaging device that were mounted at a first location and a second location to acquire images of different portions of a store shelf. The images of different shelf portions can be combined to provide a complete overview of a shelfing unit.

In some examples, dependent upon the angle of the imaging devices 102, the original raw images, first image 310 and second image 320, acquired by imaging devices 102 may be distorted or warped, whereby the images are first processed to de-warp the images and then combine the images to produce a composite image 330.

For example, the composite image 330 may be the result of a de-warping and de-skewing process, as well as a stitching process. For example, individual images captured by imaging devices 102 may be de-skewed to remove perspective effects in an image of the opposed shelf when viewed from the perspective of the imaging device of an imaging device. Specifically, a warping and skewing may occur as to portions of a shelf, and products on those portions, that are further away from and viewed at a less direct angle relative to the imaging device.

Additionally, after the de-warping and de-skewing process, two or more such images may be stitched together to form a composite image 330 of a shelf at a particular point in time. The stitched image may be a composite of the first image 310 and the second image 320 from imaging devices 102. The composite image 330 may then reflect a view of an increased length of an opposed shelf, for example appearing as a panoramic image of the opposed shelf.

The process of acquiring images and processing the acquired image to arrive at a de-warped, de-skewed, stitched composite is described in further detail in IN202111014915, filed on Mar. 31, 2021, and entitled "Shelf Mountable Imaging System", and is hereby incorporated by reference in its entirety.

Figure 4:
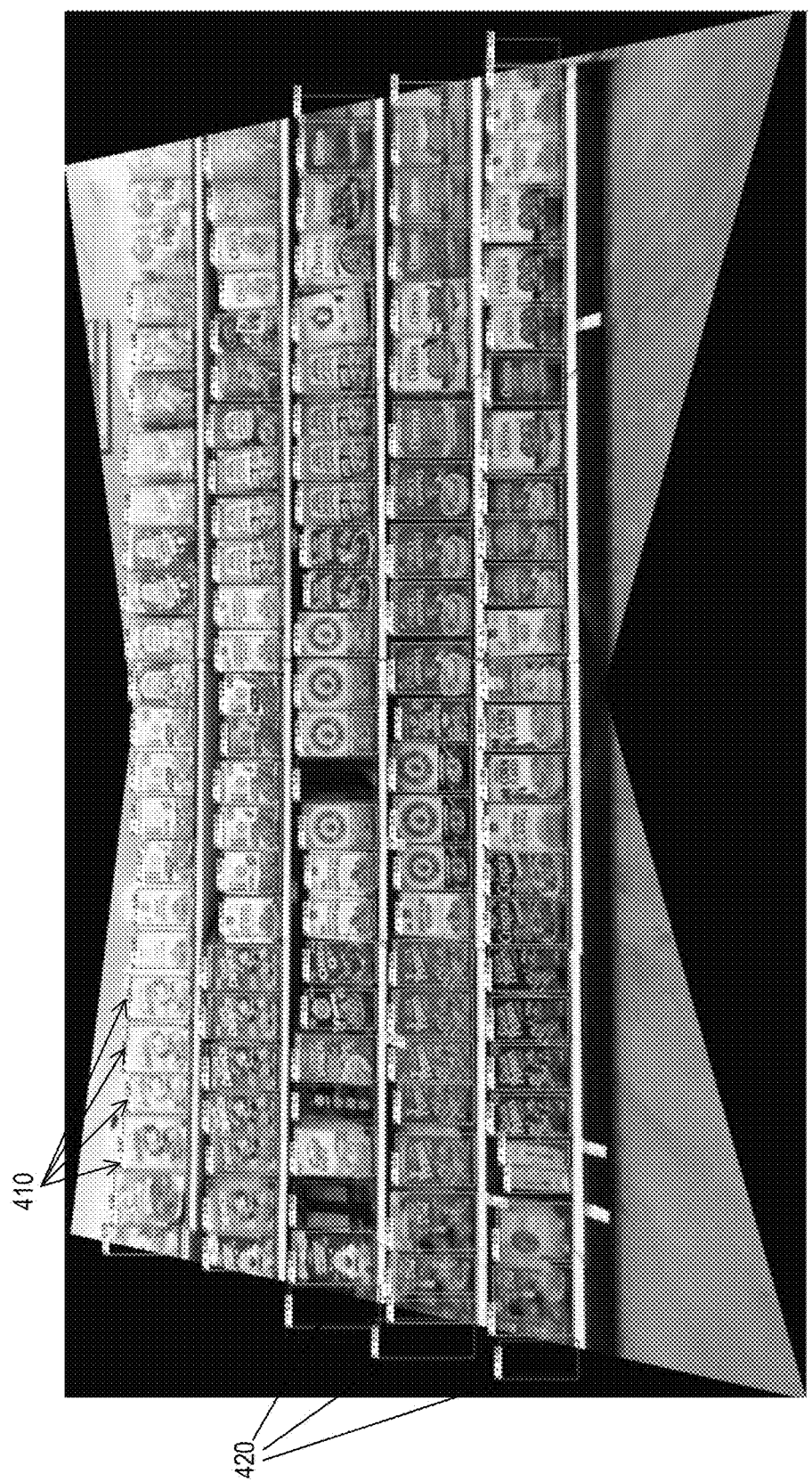
FIG. 4 illustrates an example visual representation of the processed image with bounding boxes enclosing each of the products.

FIG. 4 illustrates an example visual representation of the processed image with bounding boxes enclosing each of the products. For example, after the generation of the composite image 330 in FIG. 3, the stock availability module may be configured to detect individual objects within the processed, composite image 330 and include a visual representation, a bounding box, that encloses the boundaries of the individual objects in order to visually indicate the boundaries of the detected objects.

In some examples, the image detection sub-module 206 of the stock availability module 112 may receive the de-warped, de-skewed and stitched image from the image processing sub-module 204 and analyze the image to detect individual objects within the image. The detection of the objects within the image and addition of bounding boxes 410, 412 to indicate the boundaries of the objects is, as described in FIGS. 2 and 5, done using a Cascade R-CNN algorithm.

In some examples, the Cascade R-CNN algorithm may only detect the boundaries of a product that is located within the composite image 330 and include a bounding box 410 to indicate the boundaries of the detected individual product. In other examples, the Cascade R-CNN algorithm may also detect the boundaries of empty shelf space that indicate the boundaries of an out-of-stock product that is otherwise supposed to occupy the space.

For example, in object detection, there are two main tasks, to solve the recognition problem and to solve the localization problem. The recognition problem includes distinguishing foreground objects from background. The localization problem includes assigning accurate bounding boxes to different objects. Typically, object recognition algorithms detect many "close" false positives, which may make the recognition and localization tasks difficult to accomplish. The multi-stage object detection architecture, Cascade R-CNN, consists of a sequence of detectors trained with increasing intersection over union (IoU) thresholds to be sequentially selective against close false positives. The implementation of the Cascade R-CNN architecture is described in greater detail in Cai, Zhaowei, and Nuno Vasconcelos. "Cascade R-CNN: Delving Into High Quality Object Detection." IEEE Computer Society, *CVPR* 2018: 2018 *IEEE/CVF Conference on Computer Vision and Pattern Recognition: Proceedings:* 18-22 Jun. 2018, Salt Lake City, Utah, 2018, pp. 6154-6162 and Rong, Tianze Rong, et al. *A Solution to Product Detection in Densely Packed Scenes.* 23 Jul. 2020, https://arxiv.org/abs/2007.11946.

Figure 5:
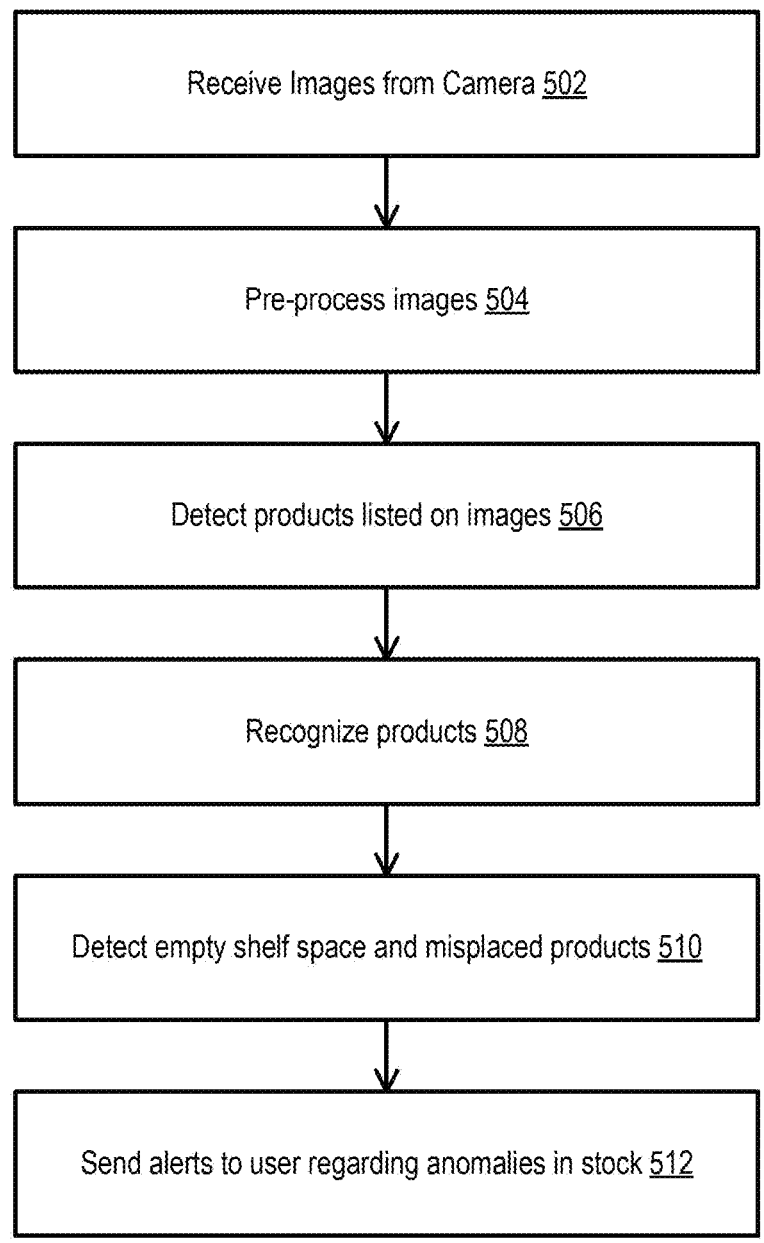
FIG. 5 illustrates an example method of assessing stock availability in a store shelf.

FIG. 5 illustrates an example method 500 of assessing stock availability in a store shelf.

In example operation 502, the communications interface sub-module 202 of the stock availability module 112 may receive one or more images of a store shelf or a portion of a store shelf. The images may be received by the stock availability module 112 via wireless communication directly from the one or more imaging devices 102 or the stock availability module 112 may receive the images following a request by the communications interface sub-module 202 to retrieve the images from the datastore 116 or server computer 110. In some examples, the one or more imaging devices 102 may be wirelessly connected to the server computer 110 and may send, and for the stock availability module 112 to receive the one or more images through wireless communication via the network 108.

In example operation 504, the image processing sub-module 204 of the stock availability module 112 may pre-process the images received in operation 502. For example, the image processing sub-module 204 may de-warp and de-skew the one or more images received in operation 502. In addition, in cases where a plurality of images covering different portions of the shelf are received by the communications interface sub-module 202 in operation 502, the image processing sub-module 204 stitches the plurality of images together to produce a single image that depicts the entire shelf image. Upon completing the de-warping and de-skewing processes, the image processing sub-module 204 may store the processed images in the datastore 116 or server computer 110. The operations of de-warping, de-skewing and stitching together images is further described in relation to FIGS. 2 and 3.

In example operation 506, the product detection sub-module 206 of the stock availability module 112 may detect objects within the composite, pre-processed image produced in operation 504. For example, the product detection sub-module 206 may retrieve the processed image from the datastore 116 or the server computer 110 and the image of the shelf may be analyzed by the product detection sub-module 206 to detect individual products within the image using an object detection algorithm. In some examples, a Cascade R-CNN algorithm may be used in detecting individual objects within the image. In other examples, other object detection algorithms may be used. Once an object is detected within the image, a bounding box may be added to the image to enclose the boundaries of the image. The placement of a bounding box on the image may help the product recognition sub-module 208 to apply product recognition algorithms on pixels enclosed by each bounding box to recognize the product associated with the detected object as described further in operation 508. The detection of objects within the shelf image is described further in relation to FIGS. 2 and 4.

In example operation 508, the product recognition sub-module 208 of the stock availability module 112 may recognize each of the products within the image processed by the product detection sub-module 206 in operation 506. For example, the product recognition sub-module 208 may analyze the shelf image from operation 206 that includes bounding boxes around individual objects to identify the product within the store's inventory that matches the image of each object within a bounding box. One of a plurality of algorithms may be used for recognizing the pixels within a bounding box as associated with a product. In one example, an iterative projections algorithm may be used to detect products within the image. The iterative projections algorithm is described in greater detail in association with FIG. 6. In another example, a product fingerprint matching method can be used to detect products within the image. The product fingerprint matching method is described in greater detail in association with FIG. 7-8. Other product detection algorithms may also be used.

In example operation 510, the missing/misplaced product identification sub-module 210 of the stock availability module 112 may retrieve the processed image from the datastore 116 or server computer 110 and analyze the processed image to identify bounding boxes within the processed image that do not include a product at all or bounding boxes that are identified to include a product that does not match the product that the corresponding location within the shelf is supposed to include. For example, the missing/misplaced product identification sub-module 210 may compare the location of a bounding box to planogram data or to historical data regarding the product occupying the position within the shelf to determine the product associated with that position. For example, the planogram data and/or historical data regarding the products may be stored in the datastore 116 or server computer 110 depending on whether the server computer 110 is a central server computer associated with a plurality of retailer locations or whether the server computer 110 is a local server computer located within the premises of a particular retailer location.

For example, if a location within the shelf includes an empty bounding box, then the missing/misplaced product identification sub-module 210 may access planogram data associated with the particular shelf to identify the product that is mapped to occupy the particular shelf location. Similarly, if the missing/misplaced product identification sub-module 210 identifies a product occupying a particular location within the store shelf as not matching the product that is mapped to occupy the particular shelf location, then the missing/misplaced product identification sub-module 210 identifies the product that is mapped to occupy the particular shelf location.

In another example, instead of using a planogram, the missing/misplaced product identification sub-module 210 may access previously stored image data over a period of time to identify the product that historically occupied the particular location on the shelf. For example, the product detection sub-module 508 may be used to analyze one or more historical images to identify the product that occupies the particular location within the shelf space. The identified product may be presumed as being the correct product associated with the particular location within the shelf.

Upon identifying anomalies within the processed image from operation 508, including empty shelf space and misplace products, the missing/misplaced product identification sub-module 210 may tag the anomalies for the communications interface sub-module 202 to send an message or notification to the user alerting them of the anomaly in operation 512. For example, the missing/misplaced product identification sub-module 210 may identify the location of the empty shelf space or misplaced item and send the identified location information to the communications interface sub-module 202 to send to the user electronic computing device 104.

When an empty shelf space is identified, the missing/misplaced product identification sub-module 210 may also send one or more of the following information to the communications interface sub-module 202 to send to the user electronic computing device 104: an image of the shelf with or without a marker identifying the empty shelf space, the imaging device identifier information, the store identifier information, the aisle identifier information, the shelf identifier information, the name of the missing product, an identifier associated with the missing product, and a stock location associated with the missing product. or misplaced product.

When an empty shelf space is identified, the missing/misplaced product identification sub-module 210 may also send one or more of the following information to the communications interface sub-module 202 to send to the user electronic computing device 104: an image of the shelf with or without a marker identifying the misplaced product, the imaging device identifier information, the store identifier information, the aisle identifier information associated with the current location of the misplaced product, the aisle identifier information associated with the actual location of the misplaced product, the shelf identifier information associated with the current location of the misplaced product, the shelf identifier information associated with the actual location of the misplaced product, the name of the misplaced product, the name of the correct product, an identifier associated with the misplaced product, an identifier associated with the correct product, and a stock location associated with the correct product. Other types of information may also be part of the communication from the communications interface sub-module 202.

In example operation 512, the communications interface sub-module 202 of the stock availability module 112 may receive the data identified by the missing/misplaced product identification sub-module 210 and send communication to the stock availability application 106 in the user electronic computing device 104 or to the user electronic computing device 104 directly with the received data. The communication may be to alert the user associated with the user electronic computing device 104 that a shelf within the store includes an empty shelf space that needs to re-stocked or a misplaced item within the shelf that needs to be returned to its correct position.

For example, the communication may include a text message or image message sent directly to the user electronic computing device 104 through an SMS or email communication. In other examples, the communication may also include sending data to the stock availability application 106 such that a user interface associated with the stock availability application 106 may be updated to display the data sent from the communications interface sub-module 202. Other ways of communication with the user electronic computing device 104 are also possible.

The communication from the communications interface sub-module 202 of the stock availability module 112 may include one or more of the following types of data: an image of the shelf with or without a marker identifying the empty shelf space an image of the shelf with or without a marker identifying the misplaced product, the imaging device identifier information, the store identifier information, the aisle identifier information associated with the current location of the misplaced product, the aisle identifier information associated with the actual location of the misplaced product, the shelf identifier information associated with the current location of the misplaced product, the shelf identifier information associated with the actual location of the misplaced product, the name of the misplaced product, the name of the correct product, the name of the missing product, an identifier associated with the misplaced product, an identifier associated with the correct product, an identifier associated with the missing product, a stock location associated with the correct product and a stock location associated with the missing product. Other types of data are also possible.

Figure 6:
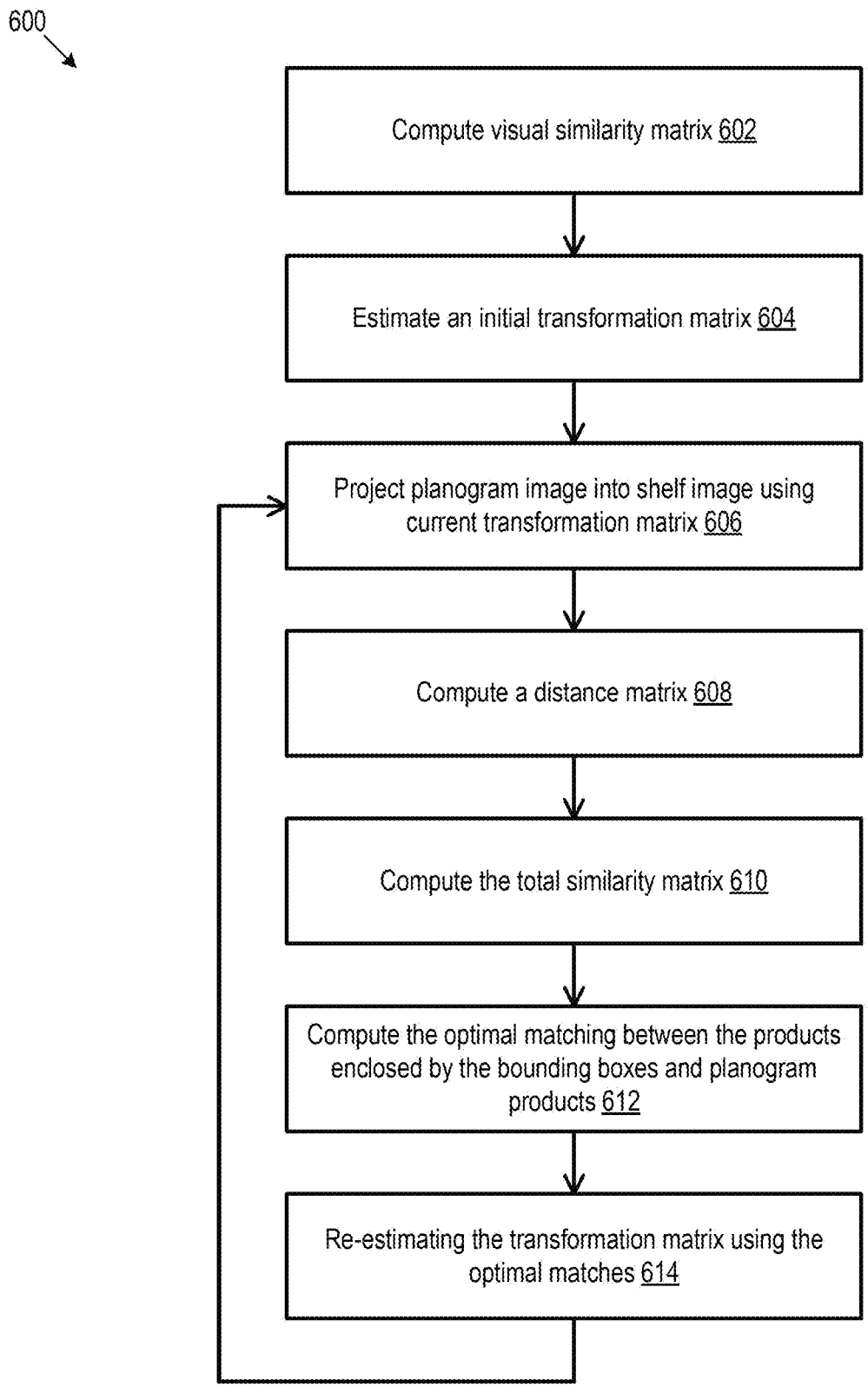
FIG. 6 illustrates an example method of recognizing products within an image.

FIG. 6 illustrates an example method 600 of recognizing products within an image.

Given an image with bounding boxes around individual products on a shelf, recognizing and identifying the product corresponding to each bounding box is difficult. In one example, the product recognition and identification can be done using an iterative projection method using both visual and spatial similarity measure.

In example operation 602, the product recognition sub-module 208 of the stock availability module 112 may compute a visual similarity matrix (VS) between the products that are enclosed by bounding boxes on the shelf image received from the product detection sub-module 206 and images associated with each of the products listed on a planogram of the shelf.

In some examples, the product recognition sub-module 208 may use a feature vector extractor, such as a deep neural network trained with metric learning, to extract features for both the contents of the detected bounding boxes of the shelf image and individual product image regions included in the reference planogram image that includes the products on the shelf as it is supposed to be stocked. For example, a feature vector may be an n-dimensional vector of numerical features that represent the object, in this case, the shelf image including bounding boxes enclosing the detected products on the shelf and the planogram, a reference visual representation of products as they are supposed to be stocked on the shelf.

Upon computing feature vectors of the products enclosed by bounding boxes on the shelf image and the products on the planogram, the product recognition sub-module 208 computes a visual similarity matrix based on the feature vectors. For example, the visual similarity matrix may be a cosine similarity matrix that is used to determine how similar two entities are irrespective of their size. The cosine similarity matrix is the cosine of the angle between the two feature vectors, the feature vector of the products enclosed by bounding boxes on the shelf image, and the feature vector of the products on the planogram. The computed visual similarity matrix may determine the visual similarity between the products enclosed by bounding boxes on the shelf image and the products on the planogram irrespective the size of the images. Other methods of computing the visual similarity matrix are also possible.

In example operation 604, the product recognition sub-module 208 of the stock availability module 112 may estimate an initial transformation matrix.

In some examples, the final mapping between the products enclosed by the bounding boxes in the shelf image and the products on the planogram uses a combination of visual and spatial similarity. The visual component is described in greater detail in operation 602. The spatial component, on the other hand, is difficult to compute. For example, the planogram includes the expected location of each product in real-world space. However, the correspondence of the real-world position of products to pixels in the image (or vice versa) is difficult to estimate.

The transformation matrix is matrix that maps the planogram space (in cm or inches) to the image space (in pixels). The transformation matrix accounts for both visual and spatial similarity. In some examples, the initial transformation matrix may be derived from the visual similarity matrix values.

In some examples, the transformation matrix may be computed if pairs of corresponding position in the two spaces is available. However, barring manual entry, which is not scalable, such data is unavailable. The disclosed solution includes an iterative procedure that alternates between matching bounding boxes to planogram facings with using those matches to compute a new estimate of the transformation matrix. The iterative process minimizes incorrect correspondences between the products enclosed by the bounding boxes in the shelf image and the products on the planogram and is utilized until optimal matching between bounding boxes and planogram products is achieved.

In some examples, the product recognition sub-module 208 is configured to iteratively refine the transformation matrix to include both visual and spatial matrix components. The iterative process of refining the transformation matrix is described below in operations 606-614. Thus, operations 606-614 may be iteratively repeated until an optimal matching between bounding boxes and planogram products is achieved.

In example operation 606, the product recognition sub-module 208 of the stock availability module 112 may project the planogram image into the shelf image using the current transformation matrix.

For example, projecting the planogram product positions into the image space may include transforming the planogram product positions using the current transformation matrix and analyzing the correspondence between the transformed planogram products positions to the positions of the products on the image space. Other ways of projecting the planogram product positions into the image space are also possible.

For example, a current transformation matrix may not be used during the first iteration of operation 606 and the planogram image may be projected into the shelf image without any transformations. However, as operation 606 is repeated during subsequent iterations, the projection of the planogram product positions into the image space may be based on the most recently calculated transformation matrix from operations 610-614, which may include both visual and spatial components.

In example operation 608, the product recognition sub-module 208 of the stock availability module 112 may compute a distance matrix (D) between the between the position of the products enclosed by the bounding boxes on the shelf image and the position of the projected planogram products. For example, a distance matrix is a square matrix containing the distances, taken pairwise, between the elements of a set. There are many methods to compute a distance matrix, including using Euclidean distance calculation methods.

In example operation 610, the product recognition sub-module 208 of the stock availability module 112 may compute the total similarity matrix (S), based on both the visual similarity matrix (VS) from operation 602 and the distance matrix (D) from operation 608. For example, the total similarity matrix may be computed as a weighted sum of the visual similarity and the current distance matrix, wherein the weight of the distance term increases linearly as the algorithm proceeds.

In some examples, the total similarity matrix may be computed using the formula:

$S = VS - i/N * a * D$, wherein:

S is the total similarity matrix;
VS is the visual similarity matrix;
i is the current iteration of estimating the transformation matrix;
N is the total number of iterations that the transformation matrix will be re-estimated;
a is an external parameter; and
D is the current distance matrix In some examples, i/N, from the formula for computing the total similarity matrix (S), may reflect how close the total similarity matrix (S) is to the optimal matching between products enclosed by the bounding boxes and planogram products. For example, a user of the stock availability system 100 may configure the product recognition sub-module 208 to iterate through operations 606-614 N number of iterations in estimating the transformation. The total number of iterations (N) may be variable but may be pre-set by the user based on the typical number of iterations taken to achieve optimal matching for the type of products on the shelf. As the current iteration (i) increases, the distance between the products enclosed by the bounding boxes and planogram products may be minimized.

In some examples, the external parameter (a) from the formula for computing the total similarity matrix (S), may be variable based on how strong the distance matrix impacts the total similarity matrix. For example, when the total similarity matrix (S) is heavily impacted by the distance matrix (D) more than the visual matrix (VS), the external parameter (a) may be configured to be higher.

In example operation 612, the product recognition sub-module 208 of the stock availability module 112 may compute the optimal matchings between products enclosed by the bounding boxes and the planogram products. For example, applying the total similarity matrix computed in operation 610 to the products enclosed by the bounding boxes in the shelf image may result in similarity matches between the products enclosed by the bounding boxes and the planogram products.

Although ideally, each product from the shelf image is matched to a product on the planogram, in some cases, applying the total similarity matrix may result in multiple products from the shelf image being matched with the same planogram product. In such cases, the product recognition sub-module 208 may assign products from the shelf image to the products from the planogram with a focus on maximizing the number of matches.

In some examples, the assignment of products from the shelf image to the products from the planogram can be done using a Hungarian algorithm. For example, the Hungarian algorithm is a combinatorial optimization algorithm that solves the assignment problem in polynomial time.

For example, in some instances, a robust matching algorithm may be used, in which each item in an image is matched to a most-similar item in the planogram without regard for duplicates. In such an algorithm, each item is the planogram is matched to each item in the image as well, again without regard for duplicates. Once both matching processes are performed, matched pairs are maintained that appear in both sets of matches, representing a cross-validation of the match between planogram images and item images from the shelf image. Other types of algorithms that solve the assignment problem can also be used.

In example operation 614, the product recognition sub-module 208 of the stock availability module 112 may use the identified optimal matchings from operation 612 to estimate or re-estimate the transformation matrix. For example, the identified optimal matchings from operation 612 may be used in a random sample consensus (RANSAC) algorithm to re-estimate the transformation matrix. The RANSAC algorithm is an iterative method to estimate parameters of a mathematical model from a set of observed data that contain outliers.

The re-estimated transformation matrix may be used in the next iteration of operations 606-614, in place of the initial transformation matrix estimated in operation 604. Thus, operations 606-614 may iterate N number of times. At the end of the last iteration, the matching between the products enclosed by the bounding boxes and the planogram products are considered optimized and can be used to detect empty shelf space and misplace products in operation 510, as described in FIG. 5 above. For example, when the method 600 produces no matches for a particular bounding box, the missing/misplaced product identification sub-module 210 may presume that the bounding box encloses an empty shelf space. Other ways of determining that the bounding box encloses an empty shelf space are also possible.

Out-of-Stock Notification Using Product Fingerprinting Algorithm

Figure 7:
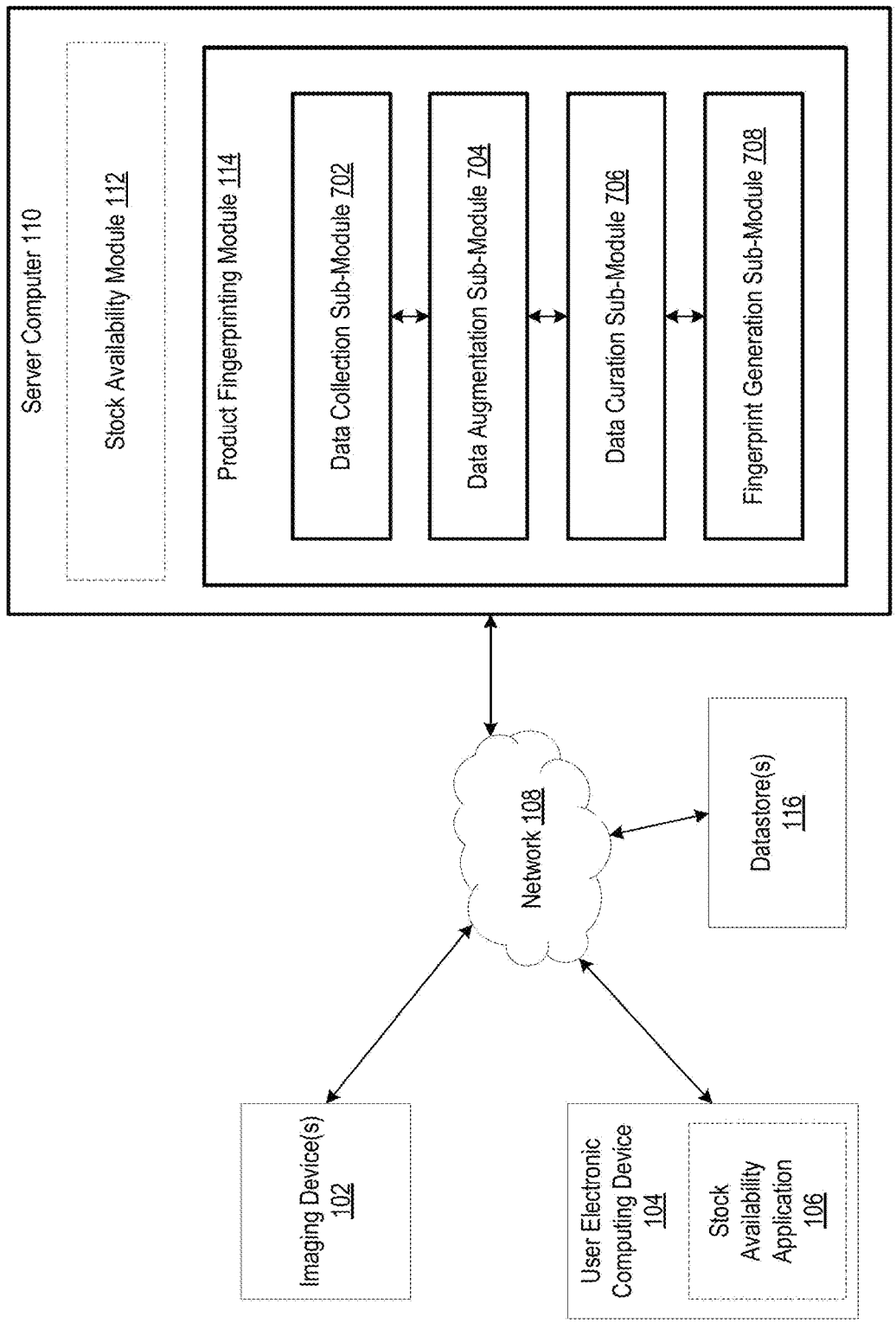
FIG. 7 illustrates an example configuration of the product fingerprinting module.

FIG. 7 illustrates an example configuration of the product fingerprinting module 114. The product fingerprinting module 114 may be used in stock availability system 100 that includes product recognition sub-module 208 that uses the product fingerprint matching method for product recognition. The product fingerprinting module 114 may be used to create and store reference fingerprints for all or a subset of products carried by the store.

In some examples, the product fingerprinting module 114 may include a data collection sub-module 702, a data augmentation sub-module 704, a data curation sub-module 706 and a fingerprint generation sub-module 708. More or fewer sub-modules may be used to implement the product fingerprinting module 114.

In some examples, the data collection sub-module 702 may be configured to receive one or more images associated with a product that is stocked within the store as part of the process of building a training data set. In one example, the data collection sub-module 702 may receive one or more images directly from the one or more imaging devices 102, including imaging devices used in a studio setting, shelf-mounted imaging device and/or vision sensors distributed within the store. In another example, the data collection sub-module 702 may retrieve one or more images associated with a product from the database 116 where the images from the imaging devices 102 may be stored.

In some examples, the data augmentation sub-module 704 may be configured to augment the images received by the data collection sub-module 702 to further increase the overall training dataset that can be developed and stored in the database 116 to help with product detection and identification using the product fingerprinting method. Data augmentation may include generating different datasets from a real data set in order to handle data scarcity or insufficient data diversity. One technique in augmenting the images received by the data collection sub-module 702 includes transforming the two-dimensional images to 3-dimensional image. The transformation may help generate synthetic data of the products, including data for various angles and different scales. For example, for each product carried by the store, multiple datasets, including data sets related to different sizes, different angles, and different lighting, can be generated with the few available images from the data collection sub-module 702 using data augmentations methods. For example, computer vision and deep learning models may be trained to assist with the data augmentation process.

In some examples, the data curation sub-module 706 may be configured to curate the data associated with each product that is carried by the store. For example, the data collection and data augmentation processes executed by the data collection sub-module 702 and data augmentation sub-module 704 produces data, including image data, related to each product in the store. However, the data still needs to be cleaned, labeled, and tagged with a product identifier in order for the data to be easily accessible for downstream data identification and recognition processes.

In some examples, the data curation sub-module 706 may ensure that each image is tagged with a product identifier that ties the image to a product. The data curation sub-module 706 may also ensure that each product carried by the store is tagged with a location within the store, including geographical, aisle and shelf location within the store, a category of product, planogram data and other identifying features associated with the product, such as size, shape, weight, colors, fonts, graphics, brand names. The data curation sub-module 706 may further ensure that the data associated with all the products are stored in a unified format.

In some examples, the fingerprint generation sub-module 708 may generate a fingerprint associated with each product that the store stocks. For example, the fingerprint generation sub-module 708 may process the collected, augmented, curated data from the data curation sub-module 706 using several layers of deep learning algorithms to arrive at the core fingerprint associated with a product. In some examples, the fingerprint algorithm may transform image data associated with a product into a unique vector representation. The fingerprint algorithm may generate the unique vector data based on the image of the product, as well as color, shape, size, text, etc.

The deep learning network may learn the identifiers associated with a product that provide the most success in generating a fingerprint that results in product identification and recognition. For example, the fingerprint generation sub-module 708 may generate a unique fingerprint for each image associated with a product. The product fingerprints may then be stored in a product fingerprint datastore in the datastore 116. In some other examples, the product fingerprints may alternatively or in addition be stored in the server computer 110. The stored fingerprints may be used by the product recognition sub-module 208 in identifying and recognizing a product within an image using the product fingerprint matching method.

The process of building a fingerprint repository that includes a unique fingerprint for each product that is included in the inventory carried by the store is essential for product recognition and identification using the product fingerprint matching method. For example, whenever a store decides to carry a new product, the product fingerprinting module 114 may be used to generate and store a unique fingerprint for a plurality of images associated with the product.

Figure 8:
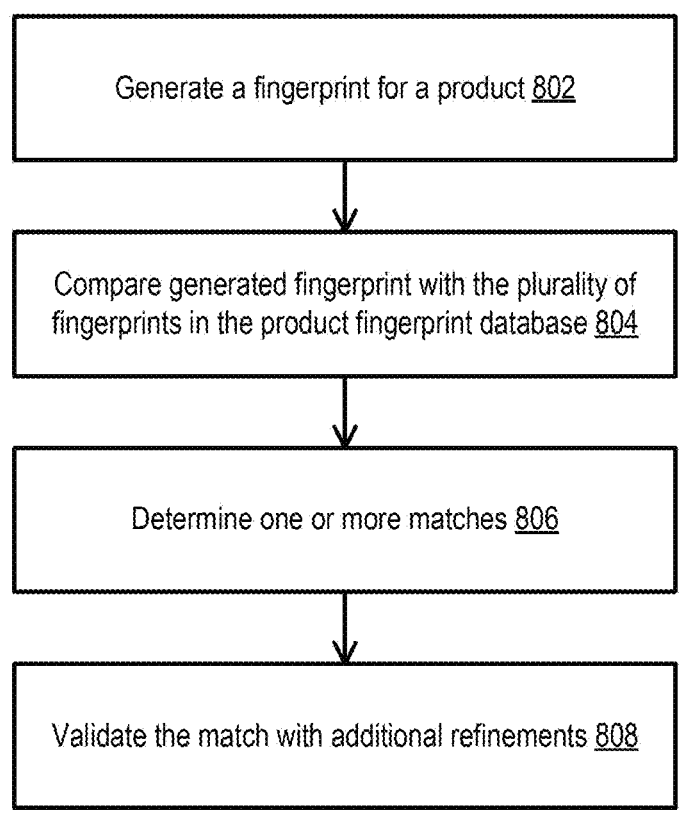
FIG. 8 illustrates an example method of recognizing a product from an image using the product fingerprint matching method.

FIG. 8 illustrates an example method 800 of recognizing a product from an image using the product fingerprint matching method.

In some examples, the product recognition sub-module 208 may receive a processed image of the store shelf, with individual objects within the image detected, from the product detection sub-module 206 as described further in relation to FIGS. 2-4. In example operation 802, the product recognition sub-module 208 may generate a fingerprint for a product within the received processed shelf image.

For example, the product recognition sub-module 208 may use the same fingerprint generation techniques and deep learning network as the fingerprint generation sub-module 708 described in relation to FIG. 7 to generate a fingerprint for a detected product from the processed shelf image.

In example operation 804, the product recognition sub-module 208 may compare the generated fingerprint for the product from operation 802 to the plurality of fingerprints associated with all products stocked by the store and stored in a fingerprint database as described in relation to the fingerprint generation sub-module 708 of FIG. 7. For example, the comparison includes a comparison the vector representation of the product with the vector representations of a plurality of products stored in the fingerprint database.

In example operation 806, the comparison of the product fingerprint to product fingerprints in the database may result in a match percentage, wherein the match percentage is a percentage of the predicted accuracy associated with the match. The product recognition sub-module 208 may identify the store product that is the closest match to the detected product that needs to be identified. For example, the product recognition sub-module 208 may identify one or more store products that have fingerprints that closely match the fingerprint of the product from the processed image that is the subject of the product recognition analysis. The comparison of the product fingerprint to the plurality of stored product fingerprints may yield matches with varying confidence levels.

For example, in case of a 10 oz box Multi-grain Cheerios cereal, the product recognition sub-module 208 may compare a generated fingerprint of the image of the 10 oz box of Multi-grain Cheerios to the database of product fingerprints. Upon completing the comparison process, the product recognition sub-module 208 may determine that several close matches exist, including a 10 oz box of Multi-grain Cheerios, an 18 oz box of Multi-grain Cheerios, a 10 oz box of Honey Nut Cheerios. The product recognition sub-module 208 may return the match results with confidence levels associated with each level. For example, product recognition sub-module 208 may determine that the match associated with the 10 oz box of Multi-grain Cheerios resulted in 92% match, whereas the match associated with the 18 oz box of Multi-grain Cheerios resulted in a 70% match and a match associated with the 10 oz box of Honey Nut Cheerios resulted in a 48% match.

In example operation 808, the product recognition sub-module 208 may receive the one or more potential matches determined in operation 806 and analyze the matches further with additional data in order to arrive a final product identification. For example, the refinement process may utilize additional reference sources including product packaging elements such as the text on the product packaging and color of the product packaging, category of the product, the location of the product, including shelf location, aisle location and geo-location in order to improve the overall accuracy and confidence level associated with the product identification.

In some examples, the product text and color information may be determined based on an analysis of the image itself using any known text recognition or color recognition algorithm. In other examples, the product category and location information may be received from the database 116 based on the imaging device identifier associated with the imaging device that captured the image. For example, data associated with each imaging device 102 may be stored in the database 116, including location of the camera, such as aisle number, shelf number, geo-location, as well the category of products associated that the imaging device covers when capturing images.

The product recognition sub-module 208 may use the additional information in order to analyze the one or more matches from operation 806 to reevaluate the confidence levels associated with the matches and arrive at a final match that is used to identify the product in the detected image from the shelf image.

Upon recognizing and identifying the product using operations 802-808, the missing/misplaced product identification sub-module 210 may proceed with operation 510 as described in relation to FIGS. 2 and 5, including detecting empty shelf space and misplaced products.

Figure 9:
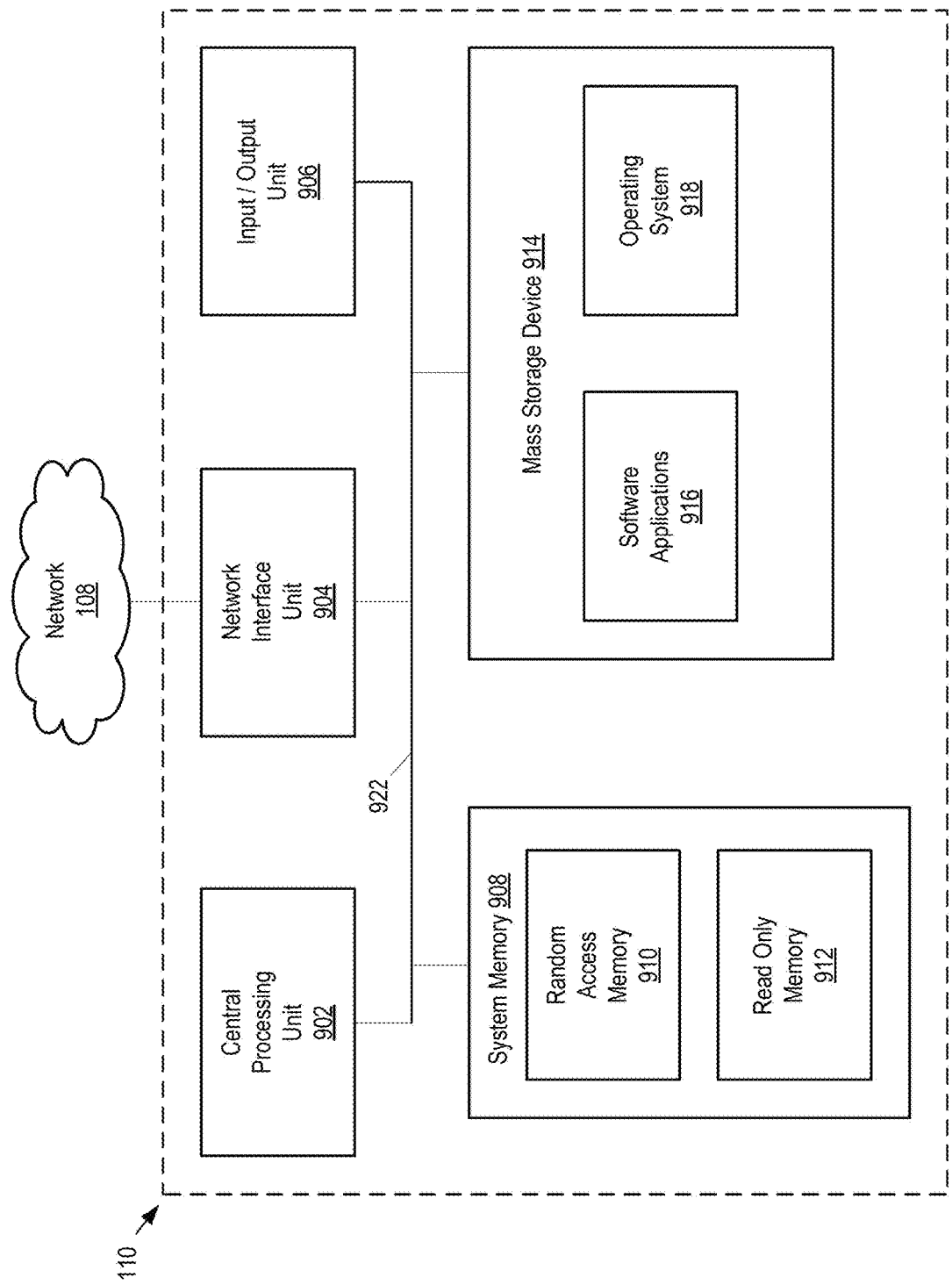
FIG. 9 illustrates example physical components of the computing devices of FIG. 1.

FIG. 9 illustrates example physical components of the computing devices of FIG. 1. As illustrated in the example of FIG. 9, the server computer 110 includes at least one central processing unit ("CPU") 902, a system memory 908, and a system bus 922 that couples the system memory 908 to the CPU 902. The system memory 908 includes a random-access memory ("RAM") 910 and a read-only memory ("ROM") 912. A basic input/output system that contains the basic routines that help to transfer information between elements within the server computer 110, such as during startup, is stored in the ROM 912. The server computer 110 further includes a mass storage device 914. The mass storage device 914 is able to store software instructions and data 916 associated with software applications 916. Some or all of the components of the server computer 110 can also be included in user electronic computing device 104.

The mass storage device 914 is connected to the CPU 902 through a mass storage controller (not shown) connected to the system bus 922. The mass storage device 914 and its associated computer-readable data storage media provide non-volatile, non-transitory storage for the server computer 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 110.

According to various embodiments of the invention, the server computer 110 may operate in a networked environment using logical connections to remote network devices through the network 108, such as a wireless network, the Internet, or another type of network. The server computer 110 may connect to the network 108 through a network interface unit 904 connected to the system bus 922. It should be appreciated that the network interface unit 904 may also be utilized to connect to other types of networks and remote computing systems. The server computer 110 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the server computer 110 can store software instructions and data associated with software applications 916. The software instructions include an operating system 918 suitable for controlling the operation of the server computer 110. The mass storage device 914 and/or the RAM 910 also store software instructions, that when executed by the CPU 902, cause the server computer 110 to provide the functionality of the server computer 110 discussed in this document. For example, the mass storage device 914 and/or the RAM 910 can store software instructions that, when executed by the CPU 902, cause the server computer 110 to display received data on the display screen of the server computer 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for identifying one or more products from an image, the method comprising:
    receiving the image from an imaging device within a retail store;
    retrieving a location where the imaging device is affixed within the retail store;
    detecting one or more products within the image;
    generating a fingerprint for a product, wherein the product is one of the one or more products;
    comparing the generated fingerprint with a plurality of reference fingerprints;
    determining one or more matches between the fingerprint and the plurality of reference fingerprints;
    using additional parameters including product category data associated with the location of the imaging device and without mapping to planogram data, refining the one or more matches to a final match between the fingerprint and a final reference fingerprint, wherein the product category data include categories of products viewable by the imaging device based on the location where the imaging device is affixed within the retail store;
    identifying a final reference product associated with the final reference fingerprint; and
    identifying the product as being the final reference product.

2. The method of claim 1, further comprising:
    receiving one or more additional images from one or more additional imaging devices;
    processing the image and the one or more additional images to remove image skewing and image warping; and
    stitching the one or more additional images to the image.

3. The method of claim 1, wherein detecting the one or more product images within the image includes detecting the one or more images using a Cascade R-CNN object detection architecture.

4. The method of claim 1, wherein generating a fingerprint includes generating a vector representation of the product from the image based on a visual representation of the product on the image.

5. The method of claim 1, further comprising:
    identifying a missing product within the image by:
        detecting a position in the image that is missing the missing product;
        analyzing one or more prior images, wherein one or more prior images are images of the shelf acquired earlier in time;
        generating a missing product fingerprint of a shelf product occupying the position in the one or more prior images;
        comparing the missing product fingerprint with the plurality of reference fingerprints;
        determining a missing product match between the missing product fingerprint and one of the plurality of reference fingerprints, wherein the one of the plurality of reference fingerprints is associated with a missing reference product;
        identifying the missing product as being the missing reference product; and
        sending a message to one or more user computing devices that the shelf is missing the missing product.

6. The method of claim 1, wherein each of the one or more reference fingerprints is associated with one of a plurality of reference products that is stocked by the retail store.

7. The method of claim 1, wherein the additional parameters further includes: product packaging elements.

8. The method of claim 1, wherein refining the one or more matches to a final match includes selecting a match among the one or more matches that is predicted to be the most accurate match by a deep neural network.

9. The system of claim 1, wherein the additional parameters further includes: product packaging elements.

10. The method of claim 5, wherein identifying the missing product is also completed without using a planogram.

11. The method of claim 6, wherein the plurality of reference fingerprints and the plurality of reference products are stored in a database.

12. A system for identifying one or more products from an image, the system comprising:
    an imaging device within a retail store;
    a computing system comprising:
        a processor;
        a memory communicatively connected to the processor which stores program instructions executable by the processor, wherein, when executed the program instructions cause the system to:
            receive the image from the imaging device;
            retrieve a location where the imaging device is affixed within the retail store;
            detect one or more products within the image;
            generate a fingerprint for a product, wherein the product is one of the one or more products;
            compare the generated fingerprint with a plurality of reference fingerprints;
            determine one or more matches between the fingerprint and the plurality of reference fingerprints;
            using additional parameters including product category information associated with the location of the imaging device and without mapping to planogram data, refine the one or more matches to a final match between the fingerprint and a final reference fingerprint, wherein the product category data include categories of products viewable by the imaging device based on the location where the imaging device is affixed within the retail store;
            identify a final reference product associated with the final reference fingerprint; and
            identify the product as being the final reference product.

13. The system of claim 12, wherein the program instructions further cause the computing system to:
    receive one or more additional images from one or more additional imaging devices;
    process the image and the one or more additional images to remove image skewing and image warping; and
    stitch the one or more additional images to the image.

14. The system of claim 12, wherein detecting the one or more product images within the image includes detecting the one or more images using a Cascade R-CNN object detection architecture.

15. The system of claim 12, wherein generate a fingerprint includes generating a vector representation of the product from the image based on a visual representation of the product on the image.

16. The system of claim 12, wherein the program instructions further cause the computing system to:
   identifying a missing product within the image, including to:
      detect a position in the image that is missing the missing product;
      analyze one or more prior images, wherein one or more prior images are images of the shelf acquired earlier in time;
      generate a missing product fingerprint of a shelf product occupying the position in the one or more prior images;
      compare the missing product fingerprint with the plurality of reference fingerprints;
      determine a missing product match between the missing product fingerprint and one of the plurality of reference fingerprints, wherein the one of the plurality of reference fingerprints is associated with a missing reference product;
      identify the missing product as being the missing reference product; and
      send a message to one or more user computing devices that the shelf is missing the missing product.

17. The system of claim 12, wherein each of the one or more reference fingerprints is associated with one of a plurality of reference products that is stocked by the retail store.

18. The system of claim 12, wherein refining the one or more matches to a final match includes selecting a match among the one or more matches that is predicted to be the most accurate match by a deep neural network.

19. A method for identifying one or more missing products from a shelf image, the method comprising:
   receiving the shelf image from an imaging device, wherein the shelf image is an image of shelf within a retail store;
   retrieving a location where the imaging device is affixed within the retail store;
   detecting a position in the shelf image that is missing a missing product;
   analyzing one or more prior shelf images, wherein the one or more prior shelf images are images of the shelf acquired earlier in time;
   generating a product fingerprint of a shelf product occupying the position in the one or more prior shelf images;
   comparing the product fingerprint with a plurality of reference fingerprints;
   determining one or more product matches between the product fingerprint and the plurality of reference fingerprints;
   using additional parameters including product category data associated with the location of the imaging device and without mapping to planogram data, refining the one or more product matches to a final product match between the product fingerprint and a final reference product fingerprint, wherein the product category data include categories of products viewable by the imaging device based on the location where the imaging device is affixed within the retail store;
   identifying a final reference product associated with the final reference product fingerprint; and
   identifying the missing product as being the final reference product; and
   sending a message to one or more user computing devices that the shelf is missing the missing product.

* * * * *